(12) United States Patent
Jones et al.

(10) Patent No.: US 9,730,389 B2
(45) Date of Patent: Aug. 15, 2017

(54) ADJUSTABLE ROLLER FRAME ASSEMBLY FOR PICK-UP REEL

(71) Applicant: HCC, Inc., Mendota, IL (US)

(72) Inventors: Dennis John Jones, Mendota, IL (US); Paul Jeffrey Aubry, Ottawa, IL (US); James Joseph Legner, Geneva, IL (US)

(73) Assignee: HCC, Inc., Mendota, IL (US)

( * ) Notice: Subject to any disclaimer, the term of this patent is extended or adjusted under 35 U.S.C. 154(b) by 56 days.

(21) Appl. No.: 14/931,429

(22) Filed: Nov. 3, 2015

(65) Prior Publication Data

US 2016/0120125 A1    May 5, 2016

Related U.S. Application Data

(60) Provisional application No. 62/075,446, filed on Nov. 5, 2014.

(51) Int. Cl.
  *A01D 57/03* (2006.01)
  *A01D 57/04* (2006.01)

(52) U.S. Cl.
  CPC ............ *A01D 57/03* (2013.01); *A01D 57/04* (2013.01)

(58) Field of Classification Search
  CPC ...... A01D 57/04; A01D 57/02; A01D 57/025; A01D 57/03
  USPC .......................................................... 56/364
  See application file for complete search history.

(56) References Cited

U.S. PATENT DOCUMENTS

| | | | |
|---|---|---|---|
| 2,071,627 A * | 2/1937 | Hawn | A01D 57/04 56/221 |
| 2,497,729 A * | 2/1950 | Tallman | A01D 57/03 56/226 |
| 2,763,118 A | 9/1956 | Gustafson | |
| 3,751,888 A | 8/1973 | James | |
| 3,975,889 A | 8/1976 | Kerber et al. | |
| 4,008,558 A * | 2/1977 | Mott | A01D 57/04 56/226 |
| 6,170,244 B1 | 1/2001 | Coers et al. | |
| 6,253,535 B1 | 7/2001 | Paulson, Jr. et al. | |
| 6,591,598 B2 | 7/2003 | Remillard et al. | |
| 6,698,175 B1 | 3/2004 | Schumacher et al. | |
| 6,779,329 B2 | 8/2004 | Yoder et al. | |
| 6,843,045 B2 | 1/2005 | Bickel | |
| 7,222,479 B2 | 5/2007 | Stahl et al. | |
| 7,395,649 B2 | 7/2008 | Wubbels et al. | |
| 8,387,351 B2 | 3/2013 | Guyer | |
| 2002/0148210 A1 | 10/2002 | Bickel | |
| 2007/0289280 A1 | 12/2007 | Marquardt | |
| 2013/0160420 A1 | 6/2013 | Swenson | |
| 2015/0272003 A1* | 10/2015 | Honey | A01D 57/025 56/181 |

(Continued)

FOREIGN PATENT DOCUMENTS

| | | |
|---|---|---|
| GB | 191109171 | 0/1912 |
| GB | 1244819 | 5/1970 |

*Primary Examiner* — John G Weiss
(74) *Attorney, Agent, or Firm* — Clark Hill PLC; James R. Foley

(57) ABSTRACT

A roller frame assembly for a pick-up reel of a harvester, where the roller frame assembly is adjustable in that its position can be easily adjusted relative to a position of a drive shaft of the pick-up reel, thereby effectively converting the pick-up reel from a flip reel to a non-flip reel, and vice versa.

17 Claims, 12 Drawing Sheets

(56) References Cited

U.S. PATENT DOCUMENTS

2015/0313081 A1* 11/2015 Jost ..................... A01D 57/03
                                                                            56/17.3

* cited by examiner

ADJUSTABLE ROLLER FRAME ASSEMBLY FOR PICK-UP REEL

RELATED APPLICATION (PRIORITY CLAIM)

This application claims the benefit of U.S. Provisional Application Ser. No. 62/075,446, filed Nov. 5, 2014, which is hereby incorporated herein by reference in its entirety.

BACKGROUND

The present invention generally relates to harvester pick up reels, and more specifically relates to a roller frame assembly for a harvester pick-up reel, where the roller frame assembly is provided as being adjustable relative to a drive shaft of the pick-up reel.

A typical harvester includes tines which are effectively driven by a pick-up reel. The tines engage the crop and pull the crop into the harvester. The desired pick up action of those tines may change depending on the crop which is to be harvested and the harvest conditions. Depending on the crop and the condition, harvesting may be easier if the tines are configured to flip while harvesting. In other situations, harvesting may be easier if the tines are configured to not flip while harvesting.

Conventional pick-up reels are designed for one type of tine action or the other. A pick-up reel that is designed to have the tines flip while harvesting is commonly referred to as a "flip reel," while a pick-up reel that is designed to have the tines not flip (or remain in a parallel state) while harvesting is commonly referred to as a pick-up reel that has "standard action." Neither type of reel is designed for conversion to the other type. In other words, if you have a harvester with a flip reel, and you would like to use that harvester to harvest crop using standard tine action (i.e., so the tines do not flip), you would need to preform many major steps, to effectively swap one pick-up reel for the other.

SUMMARY

An object of an embodiment of the present invention is to provide an adjustable roller frame assembly for a harvester pick-up reel.

Briefly, an embodiment of the present invention provides a roller frame assembly for a pick-up reel of a harvester, where the roller frame assembly is adjustable in that its position can be easily adjusted relative to a position of a drive shaft of the pick-up reel, thereby effectively converting the pick-up reel from a flip reel to a standard reel, and vice versa.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
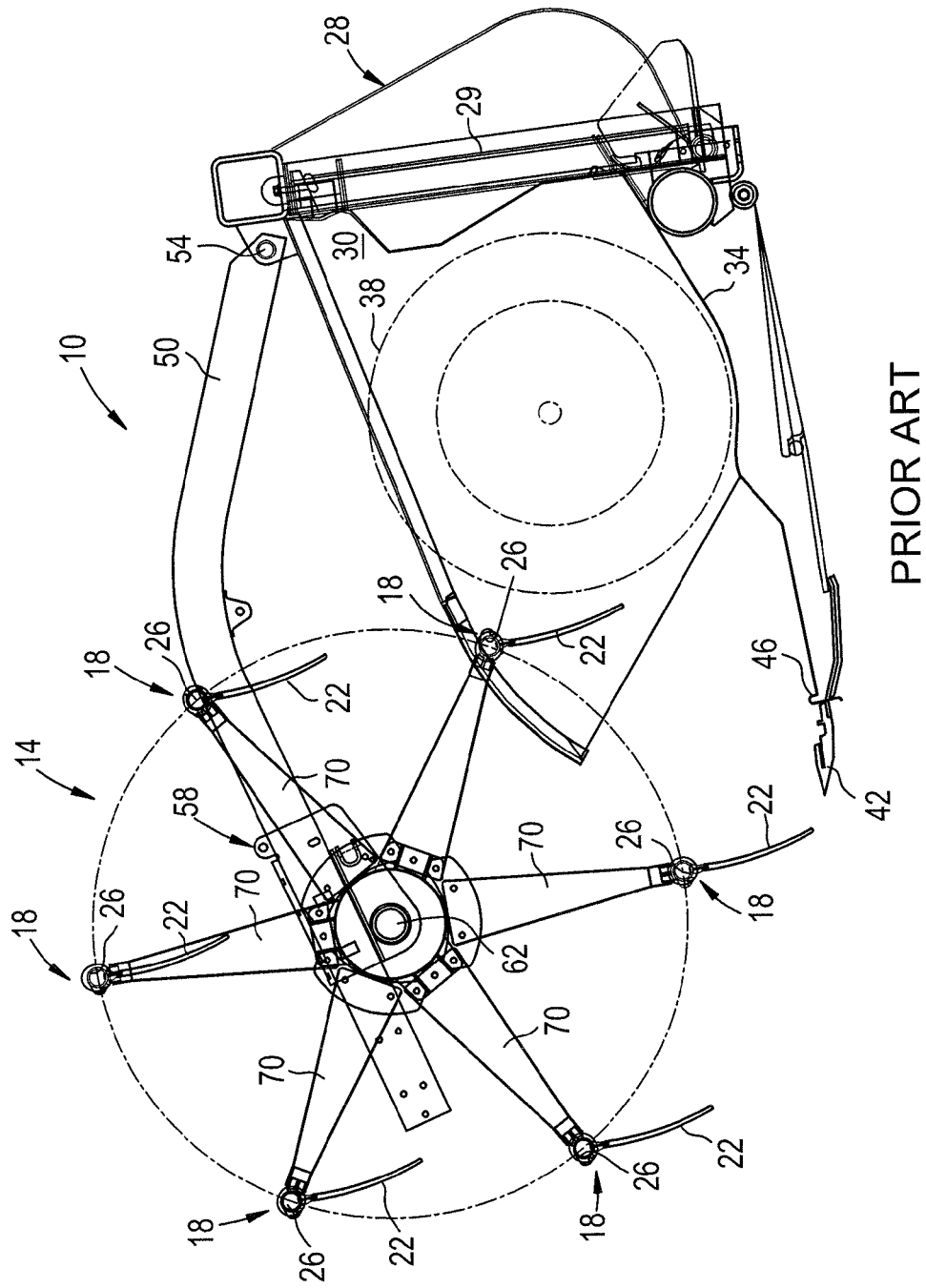
FIG. 1 is a side view of harvester which includes a pick-up reel that provides standard tine action (i.e., non-flip action) during harvesting.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

An object of an embodiment of the present invention is to provide a roller frame assembly for a harvester pick-up reel, where the roller frame assembly is adjustable in that its position can be easily adjusted relative to a position of a drive shaft of the pick-up reel, thereby effectively converting the pick-up reel from a flip reel to a standard reel, and vice versa.

First, one type of conventional harvester will be generally described (one having a flip reel), then an adjustable roller frame assembly which is in accordance with an embodiment of the present invention will be described (along with a couple alternative embodiments), then adjustment of the adjustable roller frame assembly will be described, and finally the steps required to install the adjustable roller frame assembly onto a conventional flip reel will be described.

FIG. 1 is a side view of conventional harvester 10 utilizing a conventional pick-up reel 14. As shown, the harvester 10 includes a non-flip reel, i.e, a pick-up reel 14 that provides for standard tine action (i.e., that the tines 22 do not flip during harvesting). The harvester 10 includes the pick-up reel 14 and a harvester tine and bat tube assembly 18. The assembly 18 includes harvester tines 22 and bat tubes 26, and the harvester 10 includes a harvester platform 28 including a platform frame 29, supported for movement over ground, and side and rear wall 30. A floor 34 extends between the opposite side walls 30, and a transverse crop converging auger 38 is rotatably supported above the floor 34 and forward of the rear wall 30 (unless the harvester is provided as being a draper header type of harvester, in which case cross belts would be utilized instead of an auger). A transverse cutter bar 42 is mounted along the forward edge of the floor 34, and an upright crop dam 46 is supported between the cutter bar 42 and the floor 34.

The pick-up reel 14 generally spans the width of the platform 28, forward of the auger 38 (or forward of the cross belts in the case of a draper header type of harvester) and above the cutter bar 42. The pick-up reel 14 is connected to the platform 28 by a pair of reel support arms 50 (one shown) which support the pick-up reel 14 on the frame 29. In the construction illustrated in FIG. 1, the support arms 50 are pivotally connected to the frame 29 at pivot points 54. The support arms 50 are generally above the sidewalls 30 of the platform 28. Preferably, the support arms 50 are selectively vertically adjustable by a pair of cylinders (not shown) connected between the support arms 50 and the sidewalls 30.

A movable support structure 58 is supported at the forward end of each support arm 50. The support structures 58 are generally slidable between forward and rearward positions on the support arm 50, and their movement is controlled by a pair of cylinders (not shown). The support arms 50 and the support structures 58 are adjustably positioned to adjust the position of the pick-up reel 14 relative to the platform 28.

A tubular reel shaft or first shaft 62 is journalled by and extends between the support structures 58. The first shaft 62 is rotatable relative to the support structures 58 about its axis, and a plurality of arms 70 (six in the illustrated construction) radially extend from the shaft 62.

Bat tubes 26 are journalled in the outer ends of the arms 70. The bat tubes 26 are rotatable with the associated arms 70 and, in the illustrated construction, are rotatable relative to the associated arms 70. The bat tubes 26 span the width of the pick-up reel 14 and are generally parallel to and radially-spaced from the first shaft 62. A plurality of harvester tines 22 are connected to each bat tube 26 for movement with the bat tube 26 (in the illustrated construction, for rotation relative to the first shaft 62 and relative to the associated arms 70).

The above description regarding FIG. 1 was merely provided to explain one possible environment in which the present invention may exist, and should not be considered to be limiting in any way, as the present invention can be employed with reels and harvesters which are different than that which is illustrated in FIG. 1.

Figure 2:
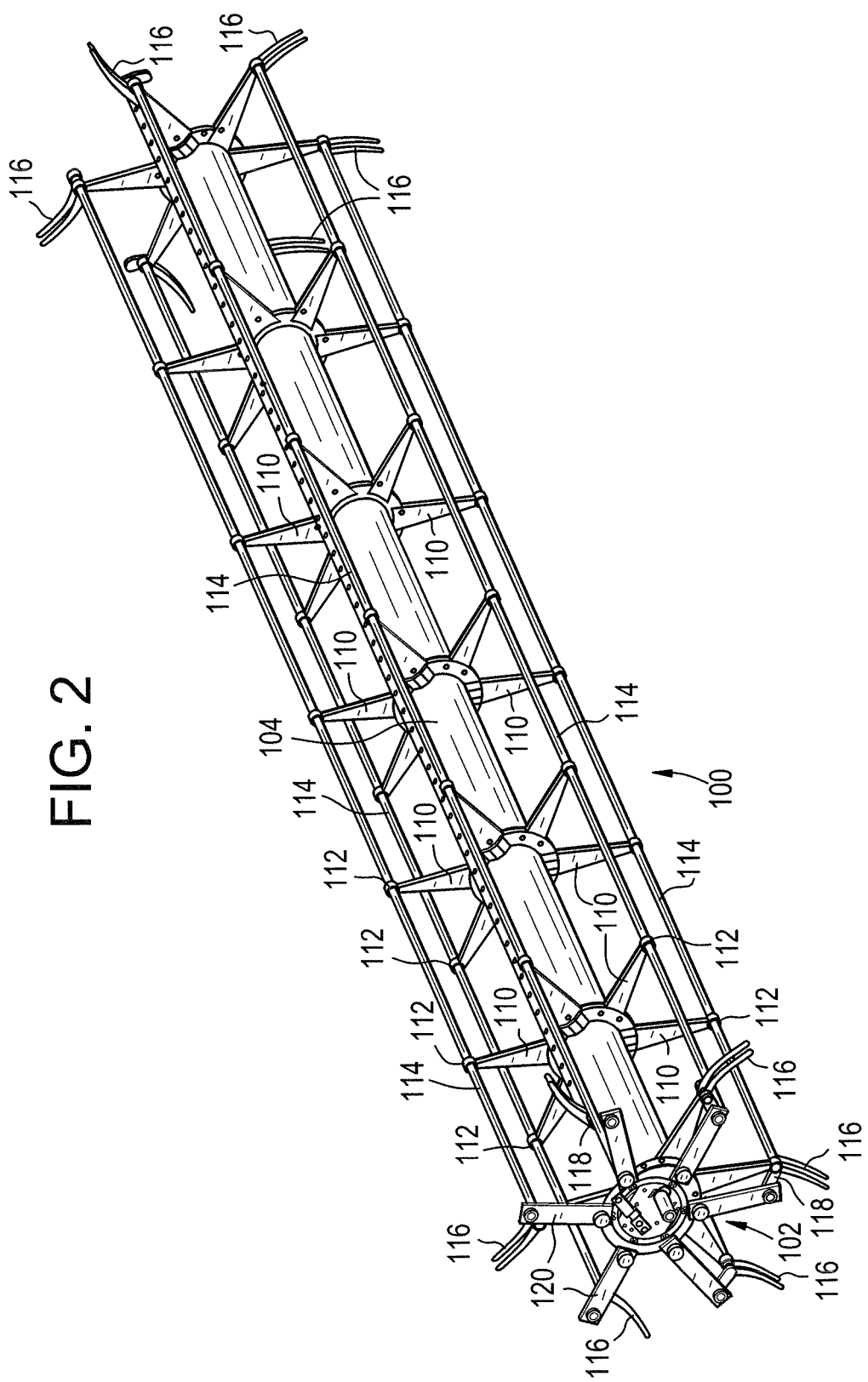
FIG. 2 shows a flip reel, where the flip reel includes an adjustable roller frame assembly at one end thereof, where the adjustable roller frame assembly is in accordance with an embodiment of the present invention.
Figure 3:
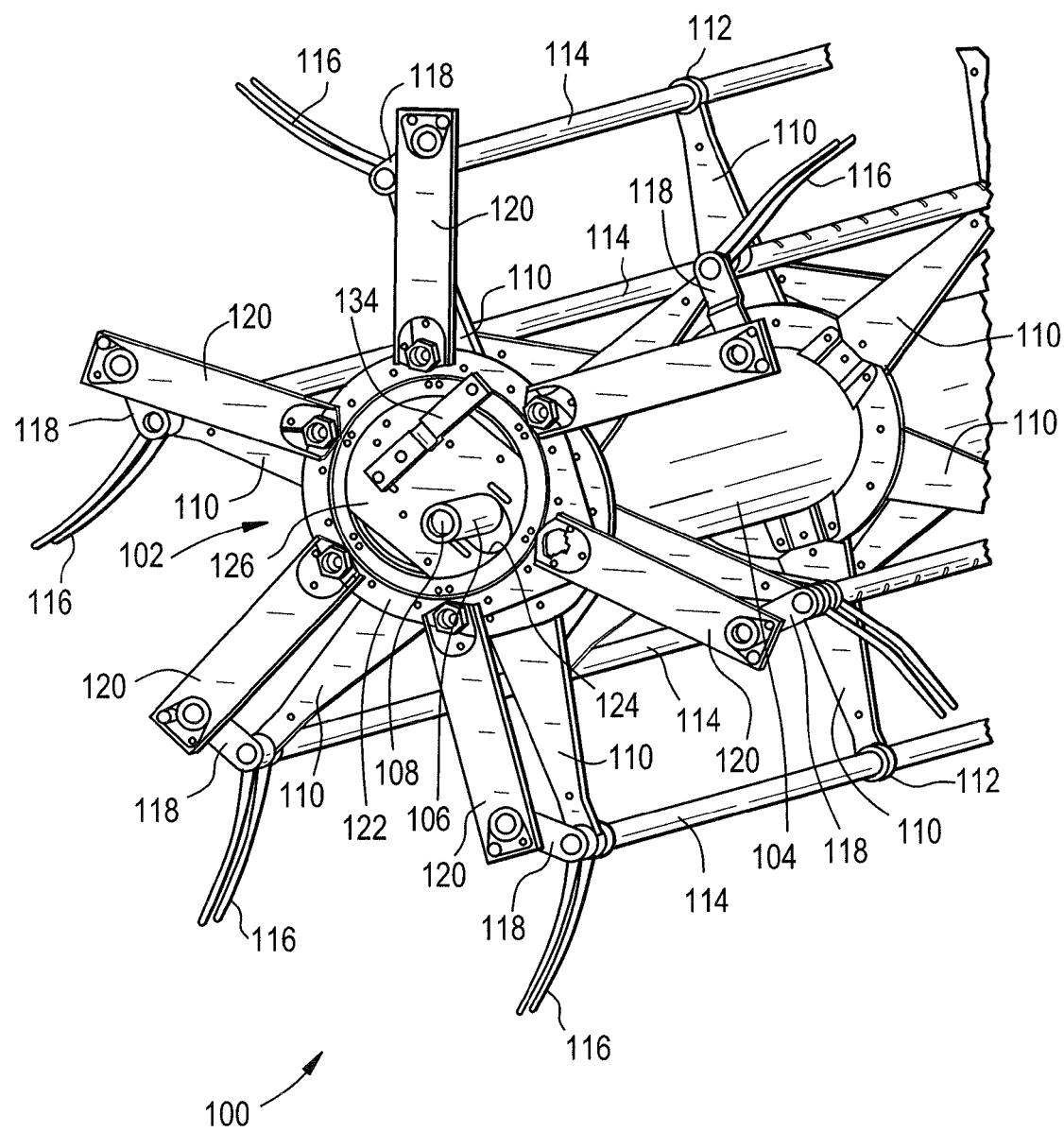
FIG. 3 provides an enlarged view of an end of the flip reel shown in FIG. 2, so the adjustable roller frame assembly can be more readily seen.
Figure 4:
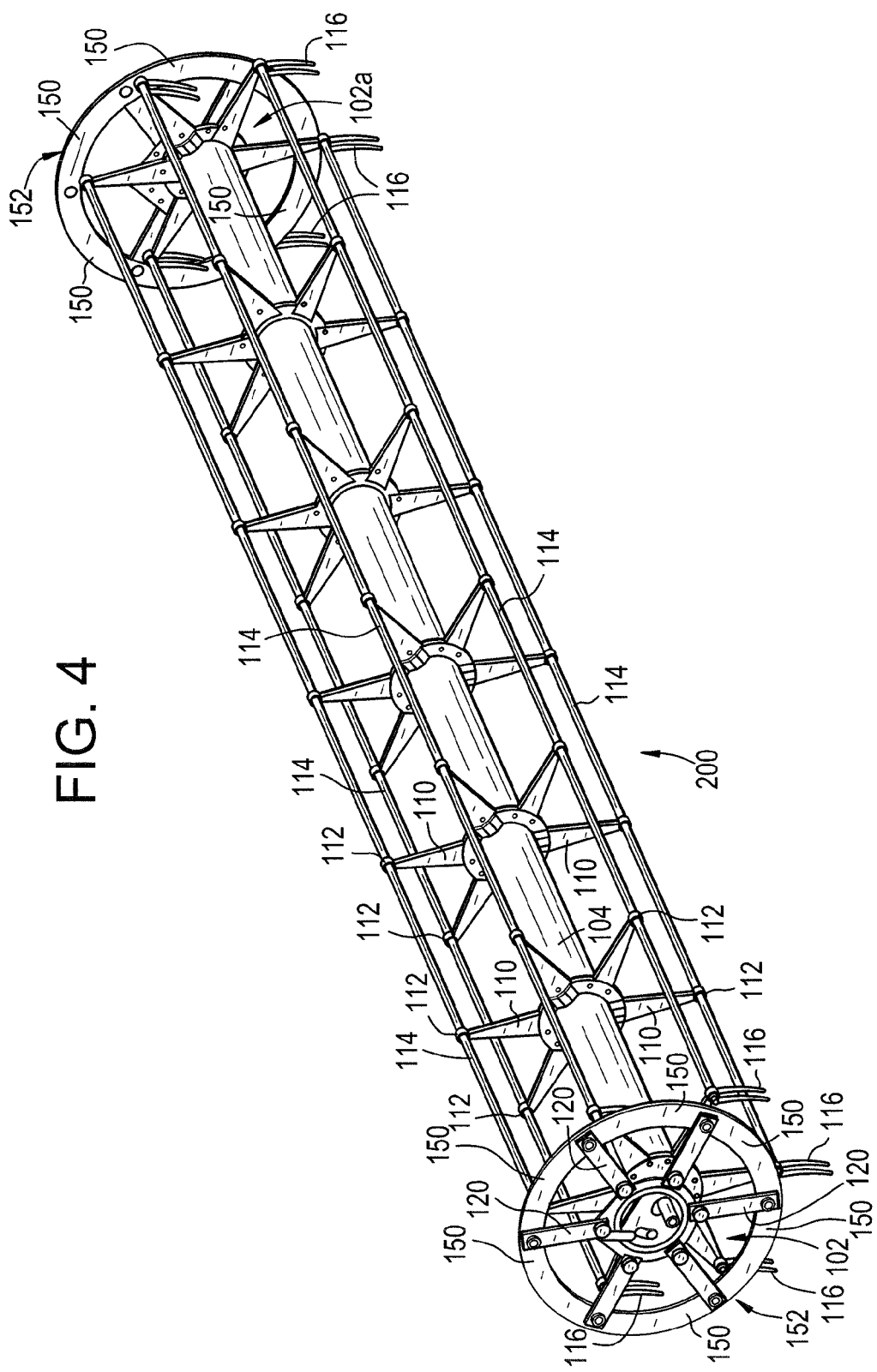
FIG. 4 shows a reel which provides for standard (i.e., non-flip) tine action, where the reel includes the adjustable roller frame assembly at both ends thereof.
Figure 5:
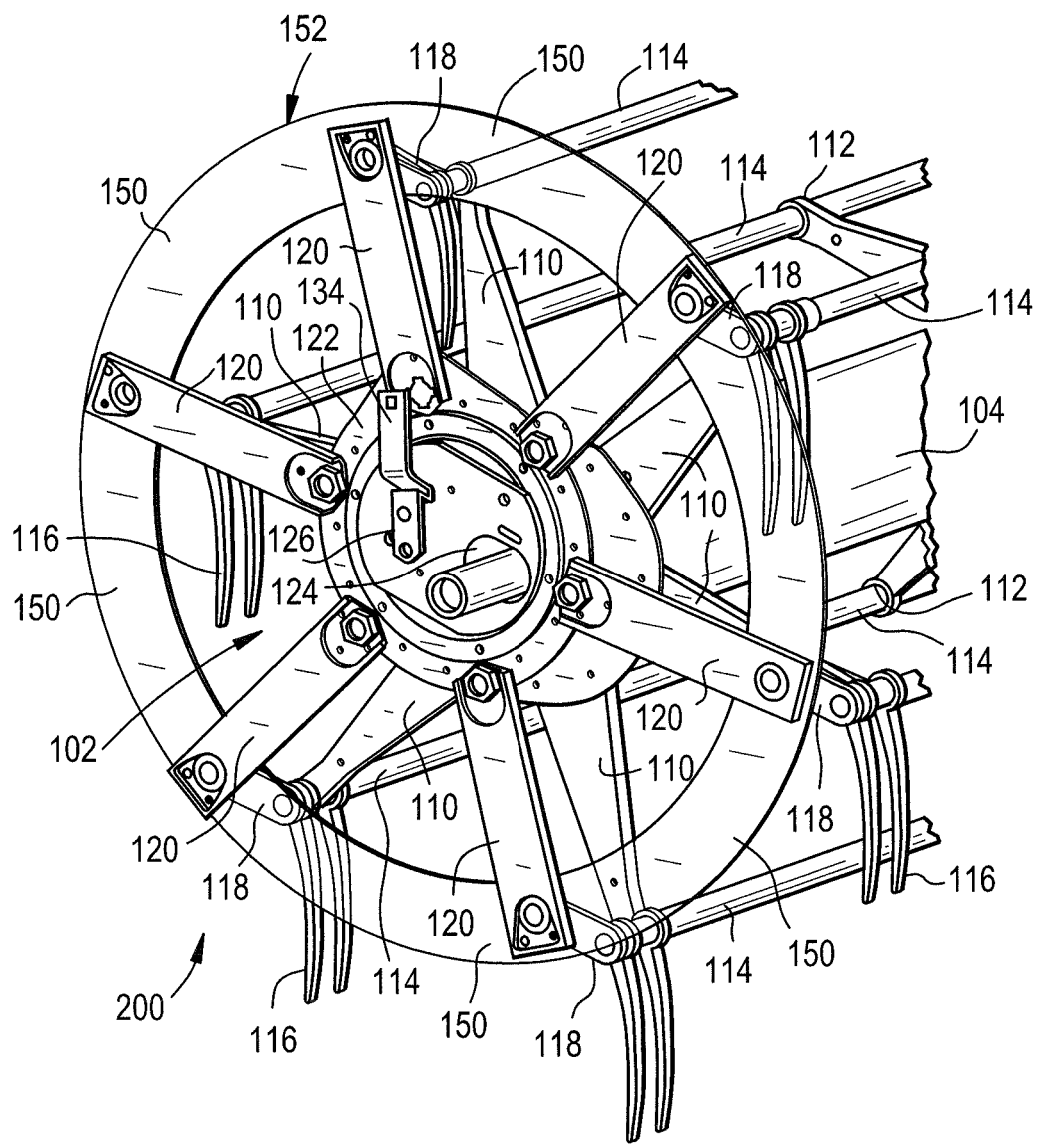
FIG. 5 provides an enlarged view of an end of the reel shown in FIG. 4, so the adjustable roller frame assembly can be more readily seen.

Two such pick-up reels 100 and 200 are shown in FIGS. 2 and 4, respectively, and each includes a roller frame assembly 102 which is in accordance with an embodiment of the present invention. As will be discussed more fully below, the roller frame assembly 102 is configured such that it can be easily adjusted, thereby effectively converting a flip reel to a non-flip reel, and vice versa. FIG. 2 illustrates the situation where the pick-up reel is configured to be a flip reel 100, while FIG. 4 illustrates the situation where the pick-up reel has been effectively converted to provide standard (i.e., non-flip) tine action, thereby providing a non-flip reel 200. In both configurations, the adjustable roller assembly 102 is included. FIG. 3 provides an enlarged view of an end of the flip reel 100 shown in FIG. 2, and FIG. 5 provides an enlarged view of the same end of the reel shown in FIG. 4, in each case so the adjustable roller frame assembly 102 can be more readily seen. It should be pointed out that while FIG. 2 shows the adjustable roller frame assembly being provided at only one end of the reel (i.e., single eccentric), FIG. 4 shows the adjustable roller frame assembly being provided at both ends of the reel (i.e., dual eccentric). This is merely by design choice depending on the size of the reel being used. In the case of a smaller reel, one need only provide the adjustable roller frame assembly at one end or the other. On the other hand, in the case of a larger reel, it may be better to provide the adjustable roller frame assembly at both ends. With regard to FIGS. 7-10, those Figures only relate to the adjustable roller frame assembly 102 provided at the end shown in FIGS. 3 and 5, with the understanding that the adjustable roller frame assembly, if provided at the other end, would just be a mirror image (identified with reference numeral 102a in FIG. 4).

The flip reel 100 shown in FIG. 2 will now be described in connection with the adjustable roller frame assembly. As shown in FIG. 2, the pick-up reel includes a center tube 104. A roller frame tube 106 carries a drive shaft 108 which extends through the center tube 104 (see FIGS. 3, 5 and 6-10). The drive shaft 108 has a central, longitudinal axis 109. The roller frame tube 106 (and internal drive shaft 108) runs along the longitudinal axis of the center tube 104. Periodically along the center tube 104 (i.e., every so many feet or inches), a set of bat tube support arms 110 extend radially from the center tube 104, and each has a bearing 112 at its end, through which a bat tube 114 extends. As such, there are a plurality of bat tubes 114 which are parallel to the center tube 104, and which are engaged with the ends of the bat tube support arms 110. Each bat tube 114 is configured such that it can rotate individually about its own longitudinal axis, in the bearings 112 provided in the ends of the bat tube support arms 110, as well as rotate collectively with the other bat tubes 114, about the longitudinal axis of the center tube 104, when the center tube 104 rotates. Each of these bat tubes 114 carries tines 116 (for simplicity, just a few are shown in the relevant Figures, even though many more would typically be employed to actually harvest), and the end of each bat tube 114 is connected to a link member 118 which is connected (at its other end) to the end of a control or flip arm 120. All of the control or flip arms 120 are connected, at their other end, to a control ring assembly 122. As can better be seen in FIG. 3 (which is similar to FIG. 2, but provides an enlarged view of the end of the reel), the roller frame tube 106 (having the drive shaft 108 disposed therein) extends through a slot 124 which is provided in a roller frame plate 126 of the roller frame assembly 102. The roller frame assembly 102, its additional components, and its operation, will be described in more detail later hereinbelow.

Figure 6:
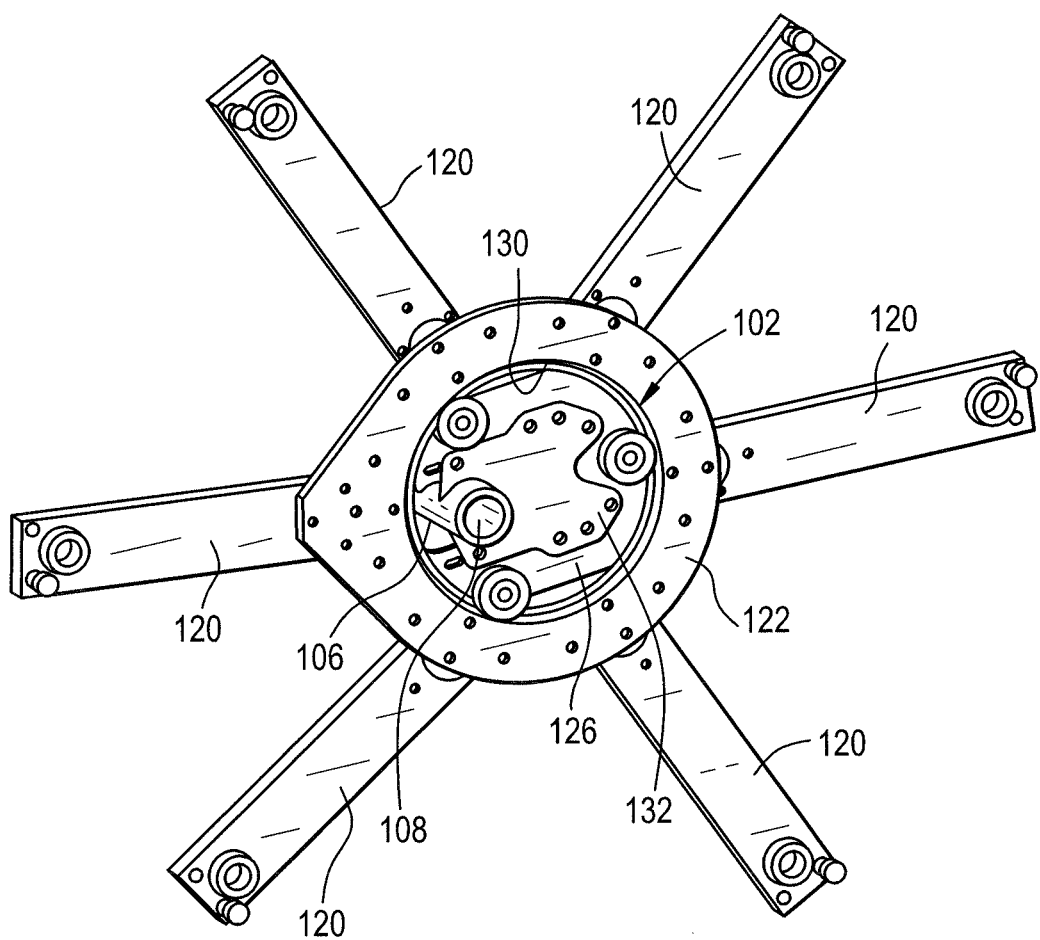
FIG. 6 shows a control ring assembly and control arms from a back side, while omitting certain other components for simplicity.

FIG. 6 shows the control ring assembly 122 and the control arms 120 from the other side (compared to FIGS. 3 and 5), while omitting, for example, the bat tubes and the center tube for simplicity. As shown in FIG. 6, the back side of the roller frame plate 126 has a plurality (such as three) rollers 128 attached thereto which, during operation, ride along an interior surface 130 of the control ring assembly 122. Reference numeral 122 is mentioned as being a control ring assembly, and reference numeral 130 is mentioned as being an interior surface of the control ring assembly, because it is preferred that the control ring assembly 122 comprise a control ring and a plate which is attached to the control ring and provides the interior surface 130. However, the control ring "assembly" can instead be provided as being a single piece which provides the interior surface 130. Therefore, the term control ring assembly should be interpreted as covering a single piece, or a multi-component assembly.

Figure 7:
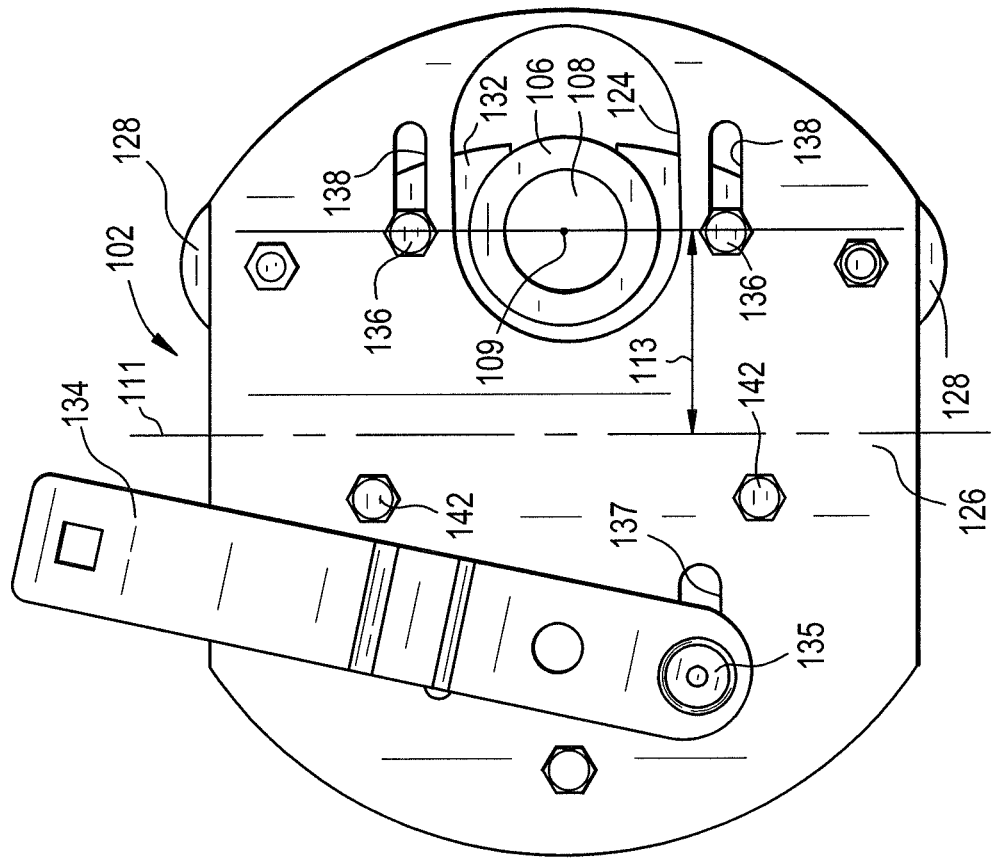
FIG. 7 shows the adjustable roller frame assembly from the front, when the assembly is configured for use with a flip reel such as is shown in FIGS. 2 and 3.
Figure 8:
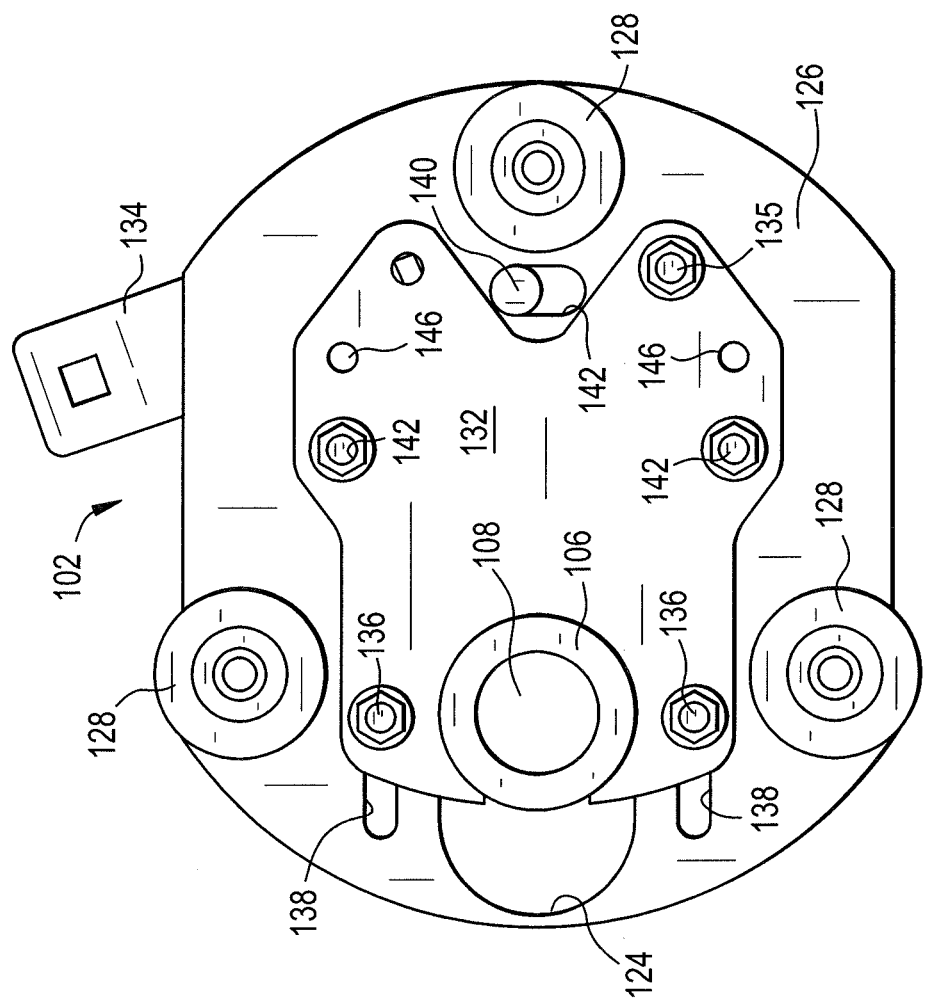
FIG. 8 is similar to FIG. 7, but shows the assembly from a back side.

The roller frame tube 106 is welded, or otherwise connected, to an adjustment plate 132, which is another component of the adjustable roller frame assembly 102. The adjustment plate 132 and the roller frame plate 126 are affixed together, and are configured such that they can be affixed together in two different positions relative to each other—a first position for when flip tine action is desired (shown in FIGS. 7 and 8), and another position for when standard (i.e., non-flip) tine action is desired (shown in FIGS. 9 and 10). As shown in FIGS. 7 and 8, in one position, the roller frame tube 106 is disposed proximate one end of the slot 124 in the roller frame plate 126, while in the other position (shown in FIGS. 9 and 10) the roller frame tube 106 is disposed proximate the other end of the slot 124.

Figure 9:
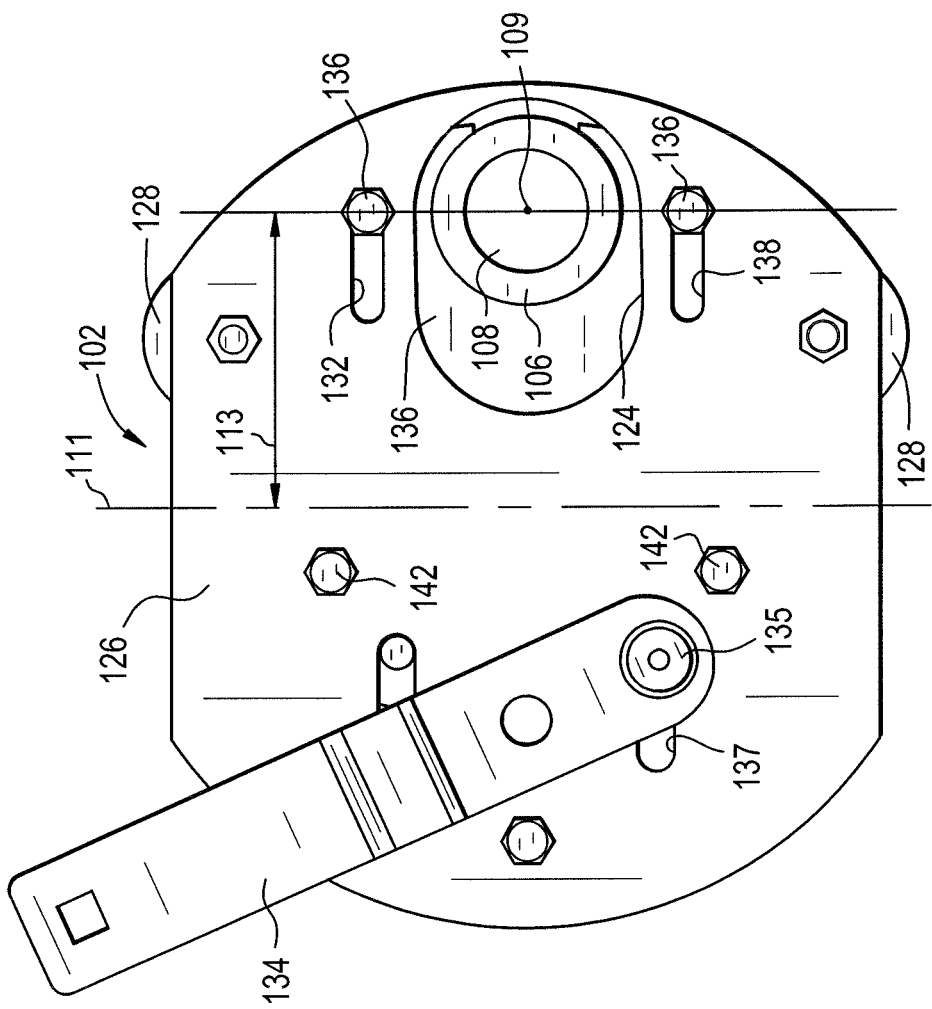
FIG. 9 shows the adjustable roller frame assembly from the front, when the assembly is configured for use with a reel such as is shown in FIGS. 4 and 5, wherein the reel provides for standard (i.e., non-flip) tine action.
Figure 10:
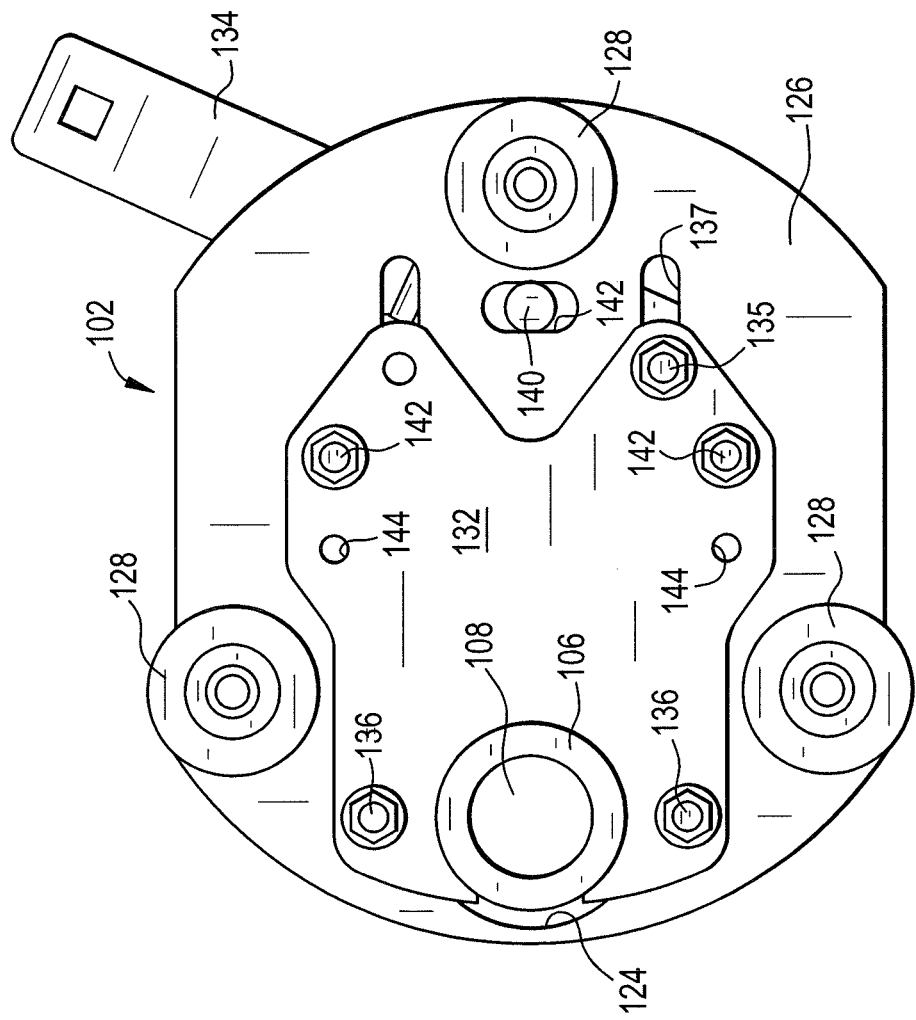
FIG. 10 is similar to FIG. 9, but shows the assembly from a back side.

FIGS. 7 and 8 relate to the state of the reel (i.e., reel 100) shown in FIGS. 2 and 3, while FIGS. 9 and 10 relate to the state of the reel (i.e., reel 200) shown in FIGS. 4 and 5. FIGS. 7 and 8 show the front and back sides, respectively, of the roller frame plate 126 when the adjustment plate 132 is in one position relative to the roller frame plate 126, while FIGS. 9 and 10 show the front and back sides, respectively, of the roller frame plate when the adjustment plate 132 is in the other position relative to the roller frame plate 126. As shown in the FIGS. 7-9, preferably a lever 134 is attached to the adjustment plate 132, to facilitate selectively moving the adjustment plate 132 back and forth between these two positions. As shown, the lever 134 may be secured to the adjustment plate 132 using a fastener 135 (such as a combination bolt and nut) which extends through a slot 137 provided in the roller frame plate 126, and the lever 134 preferably includes a guide pin 140 which extends into a corresponding aperture 142 in the roller frame plate 126. As such, the lever 134 can be actuated (by hand) causing the adjustment plate 132 to move side to side relative to the roller frame plate 126. A plurality of fasteners 136, 142 may be used to secure the roller frame plate 126 to the adjustment plate 132 once the lever 134 has been actuated to place the adjustment plate 132 in the desired position relative to the roller frame plate 126. For example, fasteners 136 can extend through slots 138 of the roller frame plate 126 and securably engage corresponding holes in the adjustment plate 132. Furthermore, or alternatively, fasteners 142 can extend through holes in the roller frame plate 126 and securably engage one set of corresponding holes 144 or another set of corresponding holes 146 in the adjustment plate 132. With regard to any fasteners 136 that extend through slots 138 in the roller frame plate 126, those fasteners 136 can be loosened before the lever 134 is actuated to change the position of the adjustment plate 132 relative to the roller frame plate 126, and then those fasteners 136 can be re-tightened to re-secure the roller frame plate 126 to the adjustment plate 132. With regard to any fasteners 142 that extend through holes in the roller frame plate 126, those fasteners 142 can be removed before the lever 134 is actuated to change the position of the adjustment plate 132 relative to the roller frame plate 126, and then re-engaged with the other set of holes 144 or 146 in the adjustment plate 132. In other words, when the adjustment plate 132 is in the position shown in FIGS. 7 and 8, holes 144 in the adjustment plate 132 can be used (these holes 144 can be seen best in FIG. 10, because they are not being used in that situation). In contrast, when the adjustment plate 132 is in the position shown in FIGS. 9 and 10, holes 146 in the adjustment plate 132 can be used (these holes 146 can be seen best in FIG. 8, because they are not being used in that situation).

With regard to what fasteners are provided, or whether a lever 134 is even provided, these details are not imperative, as there are countless ways to provide how the roller frame plate 126 and adjustment plate 132 can be connected with and disconnected from each other, and countless ways to provide means for moving the adjustment plate 132 relative to the roller frame plate 126. The important fact is just that the overall positioning can be easily and readily changed with regard to the drive shaft 108.

Figure 11:
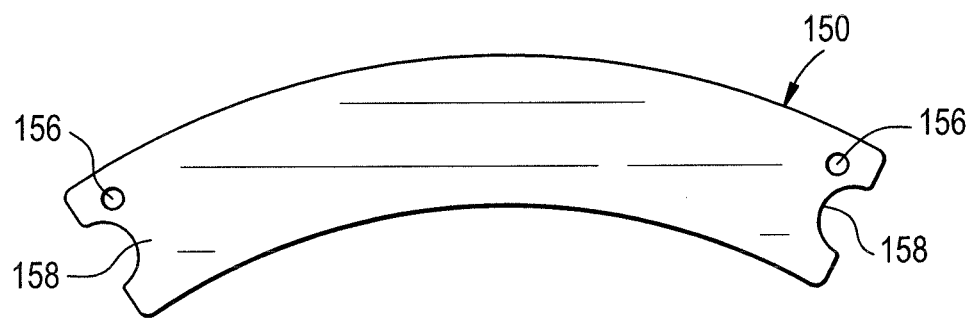
FIG. 11 illustrates an arm lock shield plate which can be used in connection with the reel shown in FIGS. 4 and 5.
Figure 12:
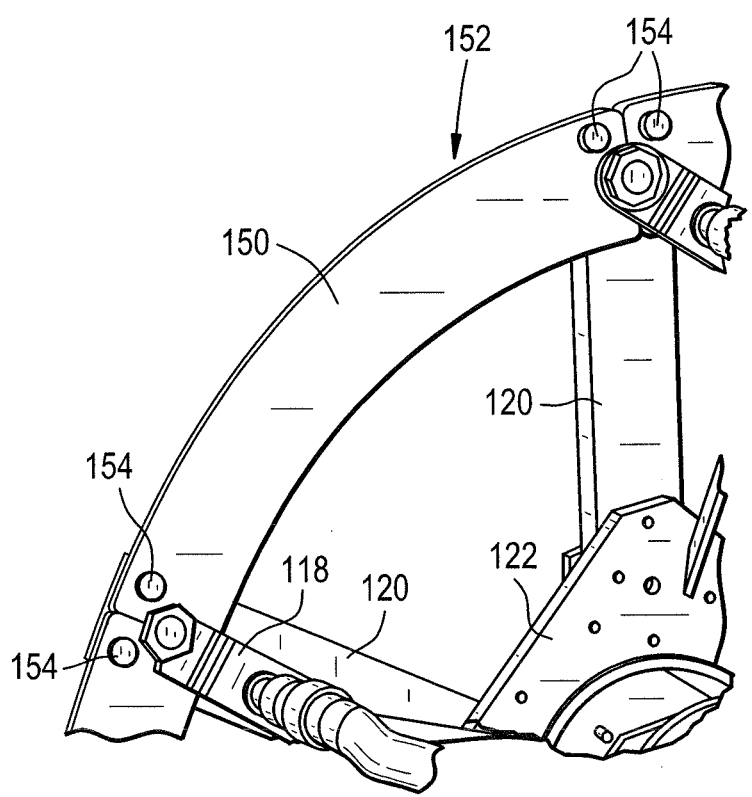
FIG. 12 shows the arm lock shield engaged and secured.

FIGS. 7 and 8 show the position of the adjustment plate 132 relative to the roller frame plate 126 when the pick-up reel is configured to be a flip reel 100 as shown in FIGS. 2 and 3, while FIGS. 9 and 10 show the position of adjustment plate 132 relative to the roller frame plate 126 when the pick-up reel is configured to provide standard (i.e., non-flip) tine action as shown in FIGS. 4 and 5, thereby providing a non-flip reel 200. The steps needed to effectively transition from FIG. 2 to FIG. 4 will now be described. To effectively convert the flip reel 100 shown in FIG. 2 to the non-flip reel 200 shown in FIG. 4, first one must disconnect each of the control or flip arms 120 from the links 118. Then, one must unsecure the roller frame plate 126 from the adjustment plate 132 (such as by removing fasteners 142 and/or loosening fasteners 136). Then, one must move the adjustment plate 132 relative to the roller frame plate 126 (such as by actuating lever 134), thereby providing that the adjustment plate 132 moves from the position shown in FIGS. 7-8 to the position shown in FIGS. 9-10. Then, one must re-secure the roller frame plate 126 to the adjustment plate 132 (such as by re-installing fasteners 142 and/or tightening fasteners 136). Then, one must install arm lock shield plates 150 between each control or flip arm 120, thereby effectively forming an arm control ring 152 as shown in FIGS. 4 and 5. Preferably, the arm lock shield plates 150 are installed using bolts 154 as shown best in FIG. 12, and may look as shown in FIG. 11, having a hole 156 proximate each end for receiving the bolt 154, and having a notch 158 at each end to fit better during installation, as shown in FIG. 12. Finally, one must re-connect each link 118 to the correct control or flip arm 120, and then one must reset the tine pitch.

To convert back to a flip reel, i.e., to effectively convert the non-flip reel shown in FIG. 4 to the flip reel shown in FIG. 2, one must first disconnect each of the control or flip arms 120 from the links 118 and then remove all the arm lock shield plates 150. Then, one must unsecure the roller frame plate 126 from the adjustment plate 132 (such as by removing fasteners 142 and/or loosening fasteners 136). Then, one must move the adjustment plate 132 relative to the roller frame plate 126 (such as by actuating lever 134), thereby providing that the adjustment plate 132 moves from the position shown in FIGS. 9-10 to the position shown in FIGS. 7-8. Then, one must re-secure the roller frame plate 126 to the adjustment plate 132 (such as by re-installing fasteners 142 and/or tightening fasteners 136). Then, one must re-connect all the control or flip arms 120 to the correct links 118, and then reset the tine pitch.

The adjustable roller frame assembly 102 allows for the distance (indicated with arrow 113 in FIGS. 7 and 9) between a centerline 111 of the eccentric roller frame 102 (including the rollers 128) and the central longitudinal axis 109 (see FIGS. 7 and 9) of the reel center drive shaft 108 to be changed readily in the field. In the example described above, the adjustability of the eccentric roller frame assembly 102 (including the rollers 128) is accomplished by removing and/or loosening fasteners 136 and/or 142 (such as bolts and nuts), and repositioning the roller frame relative 126 to the eccentric roller frame tube 106 (about the centerline of the reel center tube 104 and drive shaft 108). When the centerline 111 of the eccentric roller frame is further from the central, longitudinal axis 109 of the center tube driveshaft 108 (see FIGS. 9 and 10), a standard pickup (or parallel state) action is present as the reel rotates (see FIG. 4). In order to accomplish this standard pick-up action, the arm lock shield plates 150 must be secured between the control or flip arms 120 to prevent the control arms 120 from moving. In contrast, when the centerline 111 of the eccentric roller frame is nearer to the central, longitudinal axis 109 of the center tube driveshaft 108 (see FIGS. 7 and 8), the flip-over action is present as the reel rotates (see FIG. 2). The arm lock shield plates 150 must be removed to allow the control or flip arms 120 to pivot about their connection nearest the center tube driveshaft axis, thus allowing the flip-over action.

Now what will be described is the case where a standard flip reel is provided, and it is desired to retrofit the adjustable roller frame 102 to the standard flip reel (thereby providing that the standard flip reel can thereafter be transitioned easily between the configurations shown in FIGS. 2 and 4). A conversion kit may be provided to effect this type of conversion of a standard flip reel. Such a conversion kit may comprise, for example: one or two eccentric roller frame assemblies (i.e., one for the right side of the reel, and/or one for the left side of the reel), wherein each assembly includes a roller frame plate 126 (having rollers 128 secured thereto), and an adjustment plate 132 associated with each roller frame plate 126 where each adjustment plate 132 has a lever 134 thereon; any and all fasteners required to secure the roller frame plate 126 to the adjustment plate 132 (such as fasteners 136 and 142); a plurality (such as twelve) arm lock shield plates 150; and a plurality (such as twenty four) bolts and corresponding lock nuts (for securing the arm lock shield plates) (all of which are identified herein merely with reference numeral 154).

To install the adjustable roller frame assembly 102 which has just been described onto a conventional flip reel, some of the steps which may have to be executed may include, but may not be limited to: removing all stop bolts and spacers from the flip or control arms 120; at the end of the header, remove a chain guard to gain access to the drive chain and sprocket (not shown); loosen the set screws and pull the sprocket from the reel drive shaft (not shown); remove the rear guard plate (not shown); position a lifting device (such as a fork lift (or loader with fork attachment) with straps (not shown)) at the center of the reel 14 and attach the straps to the reel 14; remove the mounting bolts from each end bracket (i.e., right hand side and left hand side) and loosen the clamping bolts; loosen the locking collar set screws and remove the collars and washers at each end; use the lifting device to lift the reel off of the reel support arms so that the end brackets can be slid off the reel shafts; at each end, remove the nuts from the idler rollers on the eccentric roller frame assembly, remove each roller from the eccentric roller frame/control ring assembly, and slide the eccentric roller frame off the reel shaft; remove the idlers from the new eccentric roller frame assembly and slide the frame onto the reel shaft; assemble the eccentric roller frame, control ring assembly, and idler rollers together by bringing the rollers into the control ring from behind and sliding the eccentric roller frame back toward the control ring; tighten the idler nuts when all three rollers are in place; on each end, install the end brackets (which were previously removed) onto the shaft/eccentric assembly, and replace the washer and lock collar to retain the eccentric assembly on the shaft; lower the reel onto the support arms and bolt the left and right hand end brackets back in position; install the chain drive system which was previously removed in the process; and grease the shaft/eccentric assembly.

Of course, additional steps or not as many steps may need to be executed to effect the installation. Additionally, totally different parts may come into play depending on the specific structure of the pick-up reel on which one desires to install the adjustable roller frame assembly 102. The above description was merely provided as being one specific example, and should not be considered to be limiting in any way.

Figure 13:
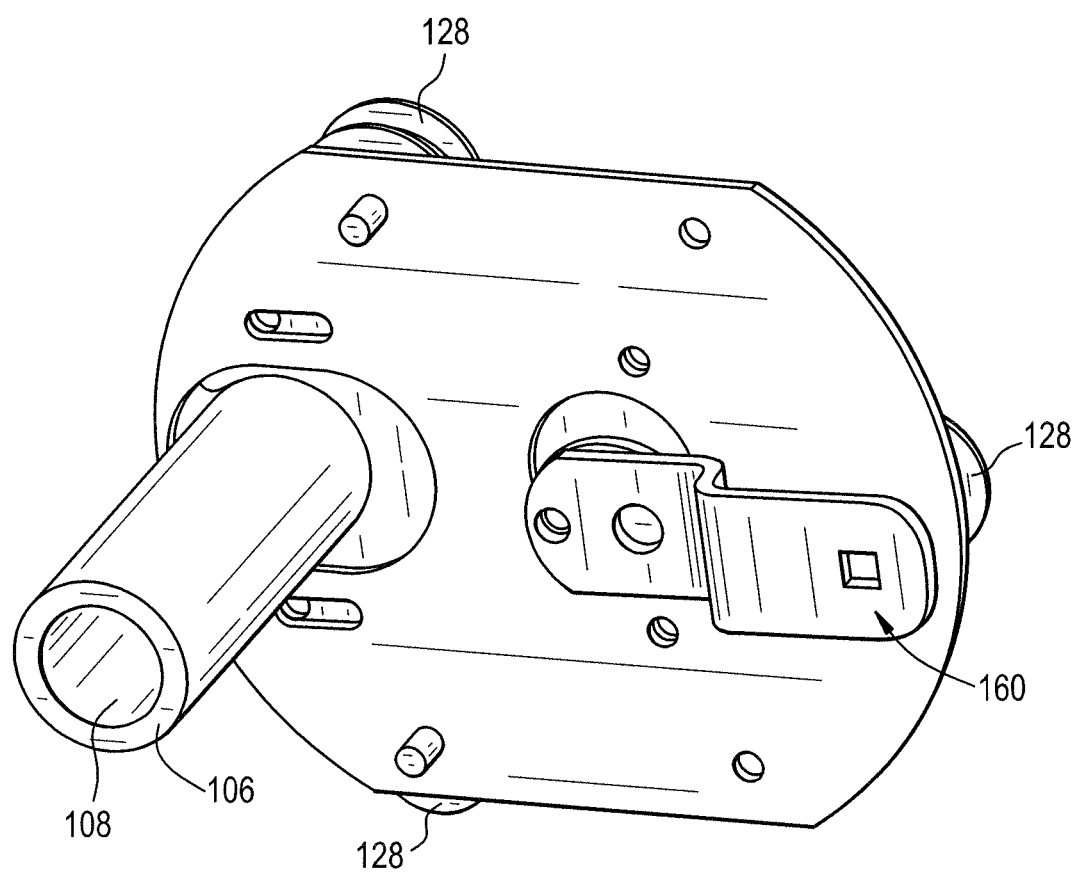
FIG. 13 shows an alternative embodiment of the adjustable roller frame assembly.

While specific embodiments of the invention have been shown and described, it is envisioned that those skilled in the art may devise various modifications without departing from the spirit and scope of the present invention. For example, FIG. 13 shows an alternative embodiment of the adjustable roller frame assembly in which a rotatable cam 160 is used to adjust the position of the roller frame. Still another possibility is to provide a rotatable screw which is affixed to the roller frame plate, perpendicular to the centerline of the center tube such that when rotated, it would adjust the position of the roller frame. Yet another possibility is to provide for remote operation by use of an electric or hydraulic actuator.

The invention claimed is:

1. An adjustable roller frame assembly for engagement with a pick-up reel having a roller surface and a drive shaft having a central longitudinal axis, said adjustable roller frame assembly comprising: an adjustment plate engageable with the pick-up reel; a roller frame plate having a centerline; at least one roller attached to the roller frame plate, said at least one roller configured to ride along the roller surface of the pick-up reel, wherein the roller frame plate is shiftable relative to the adjustment plate and the central longitudinal axis of the drive shaft, from a first position wherein the pick-up reel is configured for flip action and a second position wherein the pick-up reel is configured for standard action.

2. An adjustable roller frame assembly as recited in claim 1, wherein the adjustment plate is configured to be selectively connectable to and disconnectable from the roller frame plate.

3. An adjustable roller frame assembly as recited in claim 1, wherein a lever is connected to the adjustment plate and is configured for adjusting the roller frame plate relative to the adjustment plate, from the first position to the second position, and vice versa.

4. An adjustable roller frame assembly as recited in claim 3, wherein a fastener connects the lever to the adjustment plate, wherein the fastener extends through a slot on the roller frame plate, and is shiftable within the slot when the lever is actuated to adjust the roller frame plate relative to the adjustment, from the first position to the second position, and vice versa.

5. An adjustable roller frame assembly as recited in claim 4, wherein the lever comprises a guide pin which extends in an aperture in the roller frame plate.

6. An adjustable roller frame assembly as recited in claim 1, wherein the at least one roller comprises a plurality of rollers which are configured to ride along the roller surface of the pick-up reel.

7. An adjustable roller frame assembly as recited in claim 1, further comprising a roller frame tube, wherein the roller frame plate comprises a slot through which the roller frame tube extends.

8. An adjustable roller frame assembly as recited in claim 1, further comprising a roller frame tube, wherein the roller frame plate comprises a slot through which the roller frame tube extends, wherein the roller frame tube is disposed proximate a first end of the slot when the roller frame plate is in the first position relative to the adjustment plate, and wherein the tube is disposed proximate a second end of the slot when the roller frame plate is in the second position relative to the adjustment plate.

9. An adjustable roller frame assembly as recited in claim 1, further comprising at least one fastener which fastens the roller frame plate to the adjustment plate.

10. An adjustable roller frame assembly as recited in claim 1, further comprising a plurality of fasteners which fasten the roller frame plate to the adjustment plate.

11. An adjustable roller frame assembly as recited in claim 1, further comprising a plurality of control arms which are connectable to the pick-up reel, and a plurality of arm lock shield plates which are connectable to the control arms.

12. An adjustable roller frame assembly as recited in claim 1, further comprising a rotatable cam which is configured to adjust the position of the roller frame plate relative to the adjustment plate.

13. A pick-up reel comprising: a roller surface; a drive shaft having a central longitudinal axis; and an adjustable roller frame assembly, wherein the adjustable roller frame assembly comprises an adjustment plate; a roller frame plate having a centerline; at least one roller attached to the roller frame plate, said at least one roller configured to ride along the roller surface of the pick-up reel, wherein the roller frame plate is shiftable relative to the adjustment plate and the central longitudinal axis of the drive shaft, from a first position wherein the pick-up reel is configured for flip action and a second position wherein the pick-up reel is configured for standard action.

14. A pick-up reel as recited in claim 13, wherein a lever is connected to the adjustment plate and is configured for adjusting the roller frame plate relative to the adjustment plate, from the first position to the second position, and vice versa.

15. A method of adjusting a pick-up reel having a roller surface, a drive shaft having a central longitudinal axis, and an adjustable roller frame assembly which comprises an adjustment plate which is engaged with the pick-up reel, a roller frame plate having a centerline, at least one roller attached to the roller frame plate, said at least one roller configured to ride along the roller surface of the pick-up reel, wherein the method comprises shifting the roller frame plate relative to the adjustment plate and the central longitudinal axis of the drive shaft, from a first position wherein the pick-up reel is configured for flip action and a second position wherein the pick-up reel is configured for standard action.

16. The method as recited in claim 15, further comprising either loosening or disconnecting at least one fastener which connects the roller frame plate to the adjustment plate, before shifting the roller frame plate relative to the adjustment plate, and then either tightening or reconnecting the at least one fastener.

17. The method as recited in claim 15, further comprising using a lever to effect the shifting of the roller frame plate relative to the adjustment plate.

* * * * *